Nov. 17, 1931.  L. A. HUDSON  1,832,809
AUTOMATIC REGULATOR
Filed Sept. 29, 1928  2 Sheets-Sheet 2
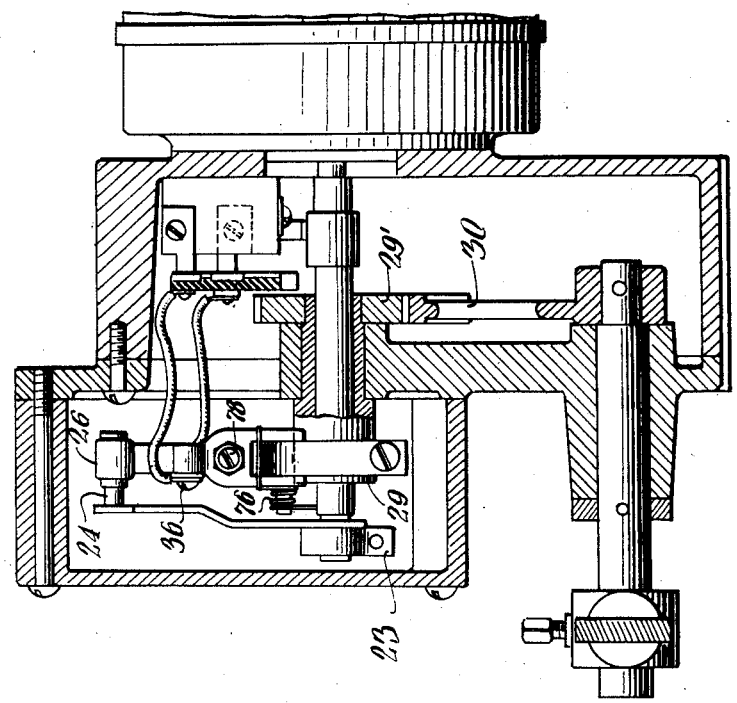
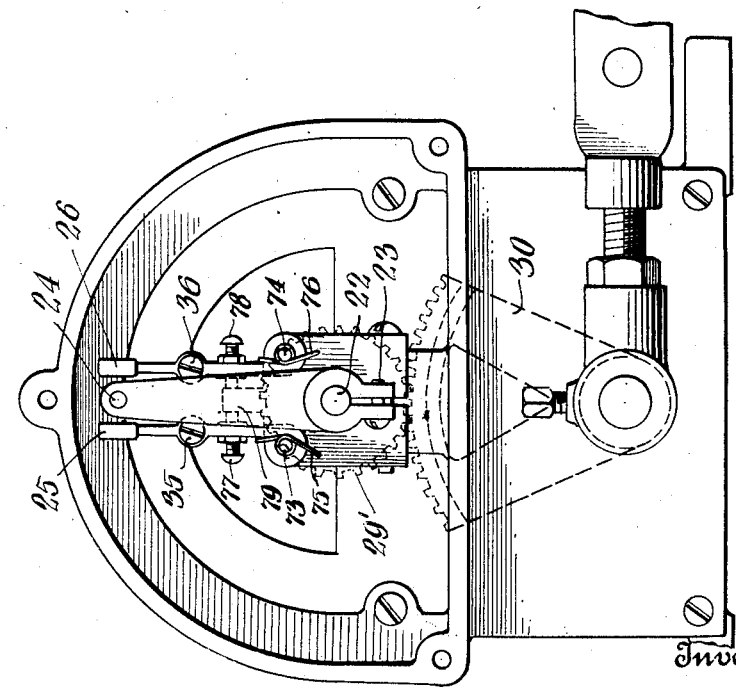
Inventor
Leo A. Hudson
By his Attorney Patented Nov. 17, 1931

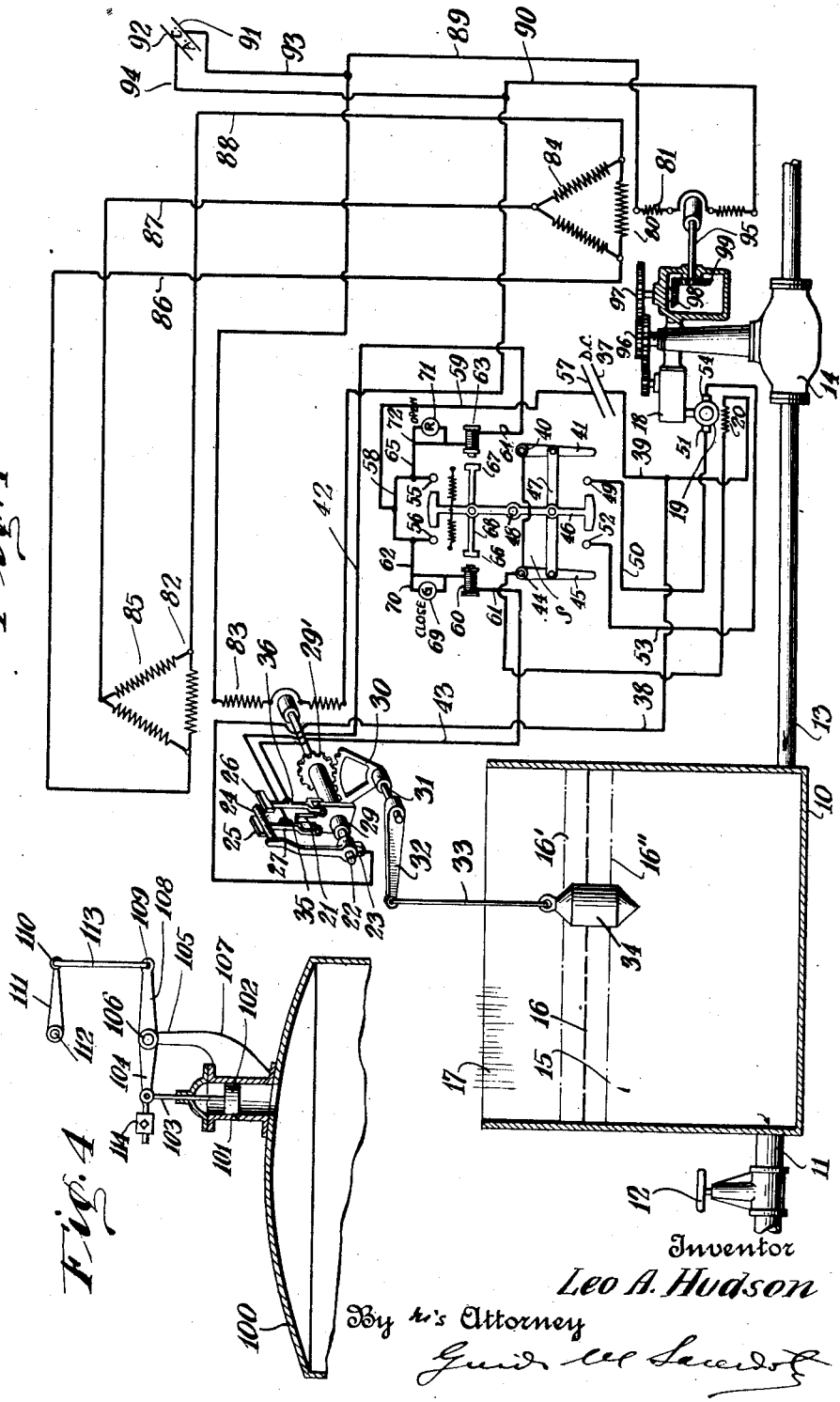

1,832,809

UNITED STATES PATENT OFFICE

LEO A. HUDSON, OF GLENBROOK, CONNECTICUT, ASSIGNOR TO ELECTRIC INDICATOR CORPORATION, OF STAMFORD, CONNECTICUT, A CORPORATION OF CONNECTICUT

AUTOMATIC REGULATOR

Application filed September 29, 1928. Serial No. 309,347.

This invention relates to regulating devices and more particularly refers to a regulator of the non-hunting type, especially adapted for use in regulating the status of a fluid, between two relatively close limits on either side of a condition which may be considered as normal.

The primary object of this invention is to provide an arrangement of a simple and reliable character whereby a certain condition or status of a fluid subject to variations may be automatically maintained within two relatively close limits.

Another object is to provide in combination with means for governing the status of a fluid within a vessel, means controlled by said fluid and responsive to changes taking place in the status thereof, causing the operation of said governing means in such a way as to counteract the action of said changes and restore the status of the fluid to normal.

A further object is to provide in apparatus of the class specified, a special arrangement of motors of the synchronous type whereby any change in the controlled fluid from normal may be utilized to cause the operation of suitable governing means so as to counteract the change and the operation of one of said synchronous motors associated therewith; the operation of said synchronous motor being in its turn utilized to impress voltages on the other synchronous motors at the regulating end, so as to discontinue the operation of the fluid governing means as soon as a normal condition has been reestablished.

A still further object is to provide in an apparatus of the class specified a special arrangement whereby any change in the status of a fluid within a container may be utilized to cause the operation of fluid flow governing means connected with said container, through the intermediary of means controlled by said fluid and responsive to changes in the status thereof—said operation being continued up to a point where said fluid flow controlling means has reached a new position determined by the change having taken place in the status of said fluid.

Other objects and advantages of the present invention will more fully appear as the description proceeds and will be set forth and claimed in the appended claims.

A variable condition of a fluid within a vessel such as its level or its pressure, may usually be regulated between two limits by using devices operated by the fluid itself when it is about to reach either limit, said devices in their turn controlling the operation of valves or other means provided for regulating the flow of liquid or the pressure as the case may be.

It is well known however, that the action of regulating and controlling devices usually lags behind the changes taking place in the status of the fluid, and the result is a continuous hunting of the regulating means.

According to the present invention, the action of the devices responsive to the changes taking place in the condition of the fluid regulated thereby is supplemented by the action of devices operatively associated with the valve or other means controlling the flow or the pressure, these devices in their turn cooperating with the corrective changes induced in the meantime, in the condition of the fluid itself towards bringing it back to normal so as to more quickly reestablish the inoperativeness of the regulating devices when the normal condition of the fluid has been reached.

It is often desirable to maintain a given condition of the fluid as close to normal as possible; this is the case for instance, in pneumatic conveyors where a certain working pressure should always be available and it is also true in connection with spray ponds for power plants where a substantially constant water level should be maintained.

My invention will be more clearly understood by referring to the accompanying drawings, in which:

Fig. 1 illustrates in diagrammatic form an embodiment of my invention as applied to the regulation of the level of a liquid in a tank;

Fig. 2 is a detailed front view in elevation of the reversing switch controlled by the variations taking place in the liquid level;

Fig. 3 is a side sectional view in elevation thereof; and

Fig. 4 is a detail sectional view in elevation illustrating an alternative arrangement for controlling the switch, adapted for use in maintaining the pressure of a fluid within a vessel.

Referring to Fig. 1, 10 designates a tank provided with an outlet 11 controlled by a valve 12 and an inlet 13 controlled by a valve 14. The tank contains a body of liquid 15, the normal level of which is shown at 16, and it is assumed that the operative conditions make it desirable to maintain said level as nearly constant as possible.

In the case of a spray pond for a power plant for instance, the sprays 17 designate the water returned to the pond through condensation of the steam; water is continually withdrawn through outlet 11 for conveyance to the boilers and new water is occasionally admitted through inlet 13 in order to make up for losses and maintain the level of the water within the tank.

Under practical conditions, the level will, of course, vary according to the difference between the inflow and the outflow, and dotted lines 16', 16" designate the maximum and minimum allowable levels respectively, between which the regulation of the inflow through inlet 13 should take place in order to establish a balance between the demand at 11 and the supply at 17.

Valve 14 may be operated by a valve operating mechanism 18 actuated by a reversible motor comprising an armature 19 and a field winding 20. The operation of said motor is controlled by a switch at the regulating end, said switch comprising a central finger 21, mounted on a shaft 22, said finger being provided with a terminal 23 and a contact member 24, and being adapted to close the motor circuit by contacting with either contact member 25 or 26 carried by arms 27, 28 respectively mounted one on each side of said finger, on a sleeve 29 rotatably mounted on shaft 22.

Sleeve 29 carries a pinion 29' which meshes with a geared segment 30 carried by another shaft 31, on which is mounted a laterally extending arm 32. Said arm is connected by a connection 33 to a float 34, immersed in the body of liquid 15 and the relation between said parts is such that when the level of the water is normal, the float maintains arm 32 in the horizontal position shown and contact member 24 is midways between contact members 25, 26.

If the level of the water in the tank rises, shaft 31 will be angularly displaced in a clockwise direction and will cause angular displacement of sleeve 29 in a counterclockwise direction so that contact member 26 will bear against contact member 24 and will close the motor circuit through terminal 36 integral with arm 28.

The motor circuit is closed through the energization of a relay so as to rotate armature 19 to operate valve 14 in the closing direction.

The reverse takes place if the level of water 15 in the tank decreases; in this case, contact member 25 will bear against contact member 24 and will close the motor circuit through terminal 35 integral with arm 27 so as to cause the rotation of armature 19 to operate the valve in the opening direction.

As stated, the angular displacement of sleeve 29 in one or the other direction causes the energization of a relay which in its turn will cause the operation of a reversing switch S establishing the proper connections in the motor circuit so as to rotate the motor in one or the other direction.

Terminal 23 is connected to main line wire 37 through wires 38, 39. On terminal 40 is pivotally mounted a contact arm 41, and on another terminal 44 connected thereto by a bridge connection 40' is pivotally mounted a contact arm 45.

Contact arms 41, 45 are simultaneously movable in one or the other direction by the action of a reversing switch arm 46 to which they are connected by a bar 47. Switch arm 46 is pivotally mounted at 48 and when it is angularly displaced in a clockwise direction, it causes arm 45 to bear against another contact terminal 52 connected by a wire 53 to the other pole 54 of armature 19.

Switch arm 46 also establishes connection between terminal 52 and another terminal 55 when it is moved in a clockwise direction to one of its extreme positions and between terminal 49 and another terminal 56 when it is moved in a counterclockwise direction to its other extreme position; terminals 55, 56 are both connected to the other main line wire 57 through bridge connection 58 and a wire 59.

An electromagnet 60 is inserted between terminal 36 and wire 58 by means of wires 43, 62, and another electromagnet 63 coaxial therewith is inserted between terminal 35 and wire 58 by means of wires 42, 65.

The armatures 66, 67 of said electro-magnets are carried by a cross member 68 attached to main switch arm 46, so that if electro-magnet 60 is energized, switch arm 46 will move in a counterclockwise direction while if electro-magnet 63 is energized switch arm 46 will move in a clockwise direction.

By virtue of this arrangement, when the level of the water within tank 10 rises and sleeve 29 is angularly displaced in a counterclockwise direction, contact member 26 will bear against contact member 24 and will cause the energization of electro-magnet 60 the circuit of which may be traced from line wire 37, through wire 39, wire 38, terminal 23, arm 21, contact members 24, 26, arm 28, terminal 36, wire 43, electro-magnet 60, wire 62, bridge 58 and back to line wire 57, through wire 59. Electro-magnet 60 will attract its armature 66 causing switch arm 46 to move in a counterclockwise direction, closing the motor circuit so as to cause rotation of armature 19 to operate the valve in the closing direction.

The motor circuit can now be traced from line wire 37, wire 39, field 20, wire 61, terminal 44, arm 45, terminal 52, wire 53, armature 19, wire 50, terminal 49, switch arm 46, terminal 56 and back to main line wire 57 through bridge connection 58 and wire 59.

If the level of the water within tank 10 decreases, sleeve 29 will be angularly displaced in a clockwise direction and contact member 25 will bear against contact 24 thereby closing the circuit of electromagnet 63 which will be energized and will in its turn cause angular displacement of switch arm 46 in a clockwise direction, so as to establish communication between terminals 52 and 55. The motor circuit can now be traced from main line wire 37 through wire 39, field 20, wire 61, terminal 44, bridge connection 40', terminal 40, arm 41, terminal 49, wire 50, armature 19, wire 53, terminal 52, switch arm 46, terminal 55 and back to main line wire 57 through bridge connection 58 and wire 59.

The current will therefore flow through armature 19 in a reverse direction and the motor will now operate the valve in the opening direction so as to increase the quantity of water admitted to the tank and thus re-establish the normal level thereof.

Suitable means may be provided if desired, indicating the operation of the valve in one or the other direction; for instance, a green bulb 69 may be shunted from wire 62 by means of a wire 70 and a red bulb 71 may be shunted from wire 65 by means of a wire 72; so that when electromagnet 60 is energized, bulb 69 will glow indicating that the valve is being operated in the closing direction, and when electromagnet 63 is energized instead bulb 71 will glow indicating that the valve is being operated in the opening direction when both bulbs are deenergized the indication will be that no operation of the valve is taking place.

The arrangement so far described would operate to regulate the level of the liquid in the tank between two extremes, but only with constant hunting of the valve. It is presumable that when the level rises or decreases, the decreased or increased supply taking place through the operation of the valve will not immediately reestablish the equilibrium between the inflow and the outflow, therefore the angular movement of shaft 13 and sleeve 29 will not cease the moment the motor circuit is closed by the action of contact members 25, 26 and either arm 27 or 28 will continue to move in the same direction until the movement of the float ceases before starting to reverse.

In order to meet this condition arms 27, 28 are yieldingly mounted, being pivoted at 73, 74, respectively and being maintained in their normal position shown by spiral springs 75, 76. Said arms are also normally held at a distance from contact member 24 by means of screws 77, 78, abutting against a lug 79, said screws providing for adjustment of said distance.

It follows that the level of the liquid may increase or decrease by a value greater than that for which the regulation is intended, with constant hunting of the valve, especially in view of the fact that as long as the circuit remains closed the valve continues to be operated in one or the other direction, so that the flow of liquid through the valve continues to increase or to decrease until the circuit is once more interrupted.

The main object of the present invention is directed to correct this condition by supplementing the action of the valve towards the correction of an undue increase or decrease in the level of the liquid with the action of other suitable means operatively associated with said valve tending to reestablish normal circuit conditions and terminate the operation of the valve as soon or nearly as soon as the level has been reestablished, said supplementary regulating means being of a sensitive and positive nature and being adapted to instantly respond to the operation of the valve.

I accordingly add to the system described, another electric circuit including two synchronous motors of the type often used for transmitting angular motion, one of said motors 80 that I will call the transmitter, having its rotor 81 operatively connected to the valve and the other motor 82 that I will call the receiver, having its rotor 83 mounted on shaft 22 at the regulating end.

Motors 80, 82, also comprise polycircuit field windings 84, 85, mounted on their stator elements. These field windings are shown as three circuit field-connected windings, and are interconnected through bus wires 86, 87, 88.

The armature windings 81, 83 are also electrically connected by bus wires 89, 90 so as to be energized from a suitable source of alternating current supply 91, 92, through wires 93, 94. Rotor 81 at the transmitting end is mounted on a shaft 95 which is operatively associated with the valve 14 through pinion 96, spur gear 97 and bevel gears 98, 99, so that a given translatory movement of the valve stem, corresponding to a given rotary movement of pinion 96 will result in a given angular displacement of shaft 95 and is rather high so that a relatively large amount of travel of the valve stem will result in a relatively small angular displacement of rotor 81.

When the valve is operated by motor 19—20, rotor 81 will be angularly moved from its normal position in one or the other direction, and in accordance with the well known mode of operation of this type of motors, voltages will be induced in the various legs of the field winding 84 which voltages are impressed on the responsive field winding 85 connected thereto, causing an angular displacement of rotor 83 of the same direction and value as that of rotor 81.

The connections between the valve and shaft 95 are such that when the valve is operated in the closing direction, shaft 95 and rotor 81 carried thereby are angularly displaced in a counterclockwise direction, while when the valve is operated in the opening direction, said shaft and rotor are angularly displaced in a clockwise direction with reference to Fig. 1.

These angular displacements produce equivalent displacements of rotor 83 and shaft 22 and therefore arm 21 with its contact member 24 will follow.

By virtue of this arrangement, as explained before, when the level of the water within tank 10 rises, sleeve 29 is angularly displaced in a counterclockwise direction so as to close the motor circuit to operate the valve in the closing direction.

As soon as the operation of the valve starts, armature 81 is rotated in a counterclockwise direction and likewise armature 83 and finger 21 will rotate in the same direction. Therefore, finger 21 will move away from arm 28, which however, is following it due to the fact that for awhile the level of the water within the tank will continue to increase.

Under normal conditions, if finger 21 were stationary, discontinued movement of sleeve 29 would result in a deformation of the spring opposing outward movement of arm 28, and the deformation of the spring would continue as long as the level continues to rise; and as the level reaches a maximum and begins to decrease still the motor circuit would remain closed up to the point where sleeve 29 and arm 28 would have reached their normal position.

However, in the meantime, the valve would have been operated in excess of the requirements so that the inflow through inlet 13 would now be so much decreased that the level would continue to decrease and the motor circuit would be pivotally reestablished through contact members 25, 24.

With the added means for regulating the motor circuit described, as long as the level in the tank continues to rise the contact between members 26 and 24 will be maintained because the speed of arm 28 would be faster than the speed of arm 21; but as soon as an equilibrium has been reached between the inflow and the outflow the movement of sleeve 29 will cease and arm 28 will only continue to move in the same direction for a relatively short period, that is, enough to reset said arm in its normal position in relation to the sleeve. In the meantime arm 21 continues to move in the same direction and as soon as arm 28 has reached its stop position, the circuit is interrupted and the operation of the valve stops.

In this new position arm 32 and the other elements of the mechanism may be angularly displaced to a certain extent one way or the other from their normal position shown in the drawings, but this will be within too relatively close limits, determined by maximum and minimum levels 16', 16" of the water within tank 10.

The conditions governing the possible displacement of finger 21, armature 83 and arms 27, 28 from their normal vertical position shown are mainly dependent upon the correct proportioning of the various parts and merely call for the application of ordinary engineering skill and practice; the proportioning of the various parts being in its turn dependent upon conditions to be met in each case.

One desirable condition which may be mentioned here is that the gearing connecting shaft 95 to pinion 96 should be so proportioned that the angular displacement of armature 81 from one extreme to the other may be somewhat less than 180° for the maximum displacement of the valve from fully open to fully closed position.

By thus preventing the possibility of the armatures swinging up to or beyond 180° a condition is insured whereby it becomes impossible for the two synchronous motors to get out of step even if something should go wrong with the current supply through the circuit in which they are inserted. This feature has also been described and claimed in another patent application for System of remote control filed simultaneously herewith.

It would be observed that the arrangement described prevents an excessive deformation of the springs holding arms 27, 28, because as soon as contact with member 24 is established through either arm finger 21 begins to move away from the arm, compensating what would otherwise result in a continued deformation of the spring holding said arm; so that as explained, when the level of the liquid is at or about normal, the circuit can be quickly interrupted.

It will be understood that the circuit of motor 19—20 can be of any conventional design and that any other type of control means may be inserted between the switch means 24—25—26 and the armature and field 19—20 of the motor.

It will be observed that the control effected by the arrangement described is different from that required in ordinary cases where a limit switch is usually employed to terminate the operation of a driving mechanism when a predetermined position of an element driven thereby has been reached or is about to be reached.

In such cases, as for instance, in remote control systems where a valve or some other appliance is operated from a distant point, all that is required of a limit switch is the termination of the operation at a predetermined time, after the operation has been started by some determining factor which may or may not be under the control of the operator.

In the present case however, the operation of the valve must be automatically controlled as a function of a variable factor which may fluctuate one way or the other and which is not under the operator's control.

While the application of my invention has been shown and described in connection with the regulation of the level of a liquid, it is obvious that with suitable modifications the invention can also be applied to other conditions where a variable factor exists capable of altering the status of the conditions to be maintained.

For instance, a similar arrangement may be adopted for maintaining the pressure of a fluid within given limits, as automatically shown in Fig. 4.

In the same 100 designates a tank or container within which a fluid is to be maintained under a given pressure as nearly constant as possible. Said tank or container is provided with a cylinder 101 within which a piston 102 is axially movable. The piston is provided with a piston rod 103 connected to the arm 104, of a lever 105 pivotally mounted at 106 on bracket 107, said lever is also provided with another arm 108 the outer end of which 109 is connected to the outer end 110 of a laterally extending arm 111 mounted on a shaft 112 by a connection 113.

Arm 104 carries a counter weight 114 the position of which may be adjusted along said arm so as to regulate the pressure exerted by said arm against piston 102. Said pressure is, of course, such as to counterbalance the normal pressure to be maintained within tank 100 when arm 104 is in a substantially horizontal position as shown.

If the pressure within tank 100 decreases, piston 102 will descend causing angular displacement of lever 105 in a couterclockwise direction, and if the pressure increases lever 105 will likewise be displaced in a clockwise direction.

The movements of lever 105 will be transmitted to arm 111 in the same direction so that shaft 112 will be operated in a manner analogous to that described in connection with shaft 31, an increase in pressure in the present instance corresponding to an increase in the liquid level in the previous instance.

The rest of the arrangement can be substantially the same as described before and the action of the switch having two members moving simultaneously in the same direction when the switch is operative will effectively maintain the pressure within tank 100 within the limits predetermined by the design of the installation.

It will be understood that although my invention has been described in connection with two synchronous motors, one at the transmitting end and the other at the receiving end, it is within the scope of the same to use other suitable transmitting and receiving devices, the only condition being that the device at the receiving end should have a member tending to remain in positional agreement with the movable member at the transmitting end operatively associated with the valve or other controlled device. However, the arrangement described is exceedingly simple and reliable and has proved to be satisfactory in practice.

It will also be observed that while in the switch described, spring contact means have been provided permitting relative movement of one switch member towards the other even after contact therebetween has been established, it is within the scope of my invention to adopt other arrangements producing the same results.

My invention is applicable also in other cases as will be understood. It is obvious that the details of arrangement and construction may vary from those shown without departing from the inventive idea; the drawings will therefore be understood as being intended for illustrative purposes only and not in a limiting sense; therefore, I accordingly reserve the right to carry my invention into practice in all those ways and manners which may enter, fairly, into the scope of the appended claims.

I claim:

1. In a device of the class described, the combination with a liquid container provided with an inlet and an outlet, of a switch comprising two separately movable members, a float actuated by the liquid within said container, operatively associated with one of said movable members, a valve controlling the liquid level within said container, electrical power means for operating said valve, a circuit controlled by said switch connecting said switch to said power means, causing the operation of said power means in one or the other direction according to the movements of said float and movable switch member associated therewith, a transmitting device having a movable member operatively associated with said valve, and an electric inductive device electrically connected thereto, having a movable member tending to remain in positional agreement with the movable member of the transmitting device, operatively associated with the other movable member of said switch, causing the same to move in the circuit opening direction when said valve is operated by said power means.

2. In a device of the class described, the combination, with a liquid container provided with an inlet and an outlet, of a switch comprising two separately movable members, a float actuated by the liquid within said container, operatively associated with one of said movable members, a valve controlling the liquid level within said container, electrical power means for operating said valve, a circuit controlled by said switch connecting said switch to said power means, causing the operation of said power means in one or the other direction according to the movements of said float and movable switch member associated therewith, an electric inductive device having a rotatable member operatively associated with said valve, and an electric inductive device electrically connected thereto, having a rotatable member tending to remain in positional agreement with the rotatable member of the first mentioned inductive device, operatively associated with the other movable member of said switch, causing the same to move in the circuit opening direction when said valve is operated by said power means.

3. In a device of the class described, the combination, with a liquid container provided with an inlet and an outlet, of a switch comprising two separately movable members, a float actuated by the liquid within said container, operatively associated with one of said movable members, a valve controlling the liquid level within said container, electrical power means for operating said valve, a circuit controlled by said switch connecting said switch to said power means, causing the operation of said power means in one or the other direction according to the movements of said float and movable switch member associated therewith, an electric inductive device having a rotatable member operatively associated with said valve, an electric inductive device electrically connected thereto, having a rotatable member tending to remain in positional agreement with the rotatable member of the first mentioned inductive device, operatively associated with the other movable member of said switch, causing the same to move in the circuit opening direction when said valve is operated by said power means, and operative connections between the rotatable member of said first mentioned inductive device, and said valve, causing an angular displacement of said rotatable member of less than 180 degrees, for a full displacement of said valve from one of its extreme positions to the other.

4. In a regulating device for correcting deviations from normal of the status of a fluid controlled thereby, a movable element responsive to the changes in the status of said fluid, means for reestablishing the normal status of said fluid, a switch solely controlled by said movable element when said switch is in its open position, electrical power means controlled by said switch operating said normalizing means, and additional electrical means operatively associated with said normalizing means, controlling said switch jointly with said movable element when said switch is in its closed position, assisting the corrective changes induced in the status of said fluid by said normalizing means, in opening said switch to terminate the operation of said power means when the normal status of said fluid is about to be restored, thereby also terminating the operation of said power, normalizing means and additional electrical means operatively associated therewith, restoring the sole control of said switch to said movable element.

5. In a system of liquid supply the combination, with a supply conduit, a delivery conduit, and a valve controlling the supply of liquid through said supply conduit, of means for automatically maintaining a balance between the demand and the supply, said means comprising a reservoir interposed between said supply and delivery conduits, a float responsive to the changes in the level of the liquid within said reservoir, electrical power means for operating said valve, a switch adapted to be solely operated by said float when said switch is in its open position controlling the circuit of said power means, and additional electrical means operatively associated with said valve, and also operatively associated with said switch, when said switch is in its closed position, assisting the corrective changes induced in the status of said liquid and float by said valve, in restoring said switch to its normal open circuit condition, thus terminating the operation of said power means, when the normal level of said liquid within said reservoir is about to be restored, thereby also terminating the operation of said valve and additional electrical means operatively associated therewith, and restoring the sole control of said switch to said float.

6. In a device of the class described, the combination with a liquid container provided with an inlet and an outlet, of a switch comprising two separately movable members, a float actuated by the liquid within said container, operatively associated with one of said movable members, a valve connected with said container, electrical power means for operating said valve, a circuit controlled by said switch connecting said switch to said power means, causing the operation of said power means in one or the other direction according to the movements of said float and movable switch member associated therewith, a transmitting device having a movable member operatively associated with said valve, and an electric inductive device electrically connected thereto, having a movable member tending to remain in positional agreement with the movable member of the transmitting device, operatively associated with the other movable member of said switch, causing the same to move in the circuit opening direction when said valve is operated by said power means.

7. In a device of the class described, the combination, with a liquid container provided with an inlet and an outlet, of a switch comprising two separately movable members, a float actuated by the liquid within said container, operatively associated with one of said movable members, a valve connected with said container, electrical power means for operating said valve, a circuit controlled by said switch connecting said switch to said power means, causing the operation of said power means in one or the other direction according to the movements of said float and movable switch member associated therewith, an electric inductive device having a rotatable member operatively associated with said valve, and an electric inductive device electrically connected thereto, having a rotatable member tending to remain in positional agreement with the rotatable member of the first mentioned inductive device, operatively associated with the other movable member of said switch, causing the same to move in the circuit opening direction when said valve is operated by said power means.

8. In a device of the class described comprising a fluid container, a movable element responsive to the changes in the status of said fluid, means controlling the flow of said fluid adapted for operation tending to counterbalance said changes, a switch solely controlled by said movable element when said switch is in its open position, electrical power means controlled by said switch operating said fluid flow controlling means, and additional electrical means operatively associated with said fluid flow controlling means, controlling said switch jointly with said movable element when said switch is in its closed position, to open said switch when said fluid flow controlling means has reached a predetermined position in accordance with a change in the status of the fluid within said container, thereby also terminating the operation of said power means, fluid flow controlling means and additional electrical means operatively associated therewith and restoring the sole control of said switch to said movable element.

LEO A. HUDSON.